(12) United States Patent
Schelle et al.

(10) Patent No.: US 9,639,646 B2
(45) Date of Patent: May 2, 2017

(54) SYSTEM-ON-CHIP INTELLECTUAL PROPERTY BLOCK DISCOVERY

(71) Applicant: Xilinx, Inc., San Jose, CA (US)

(72) Inventors: Graham F. Schelle, Longmont, CO (US); Paul R. Schumacher, Berthoud, CO (US); Adrian M. Hernandez, Longmont, CO (US)

(73) Assignee: XILINX, INC., San Jose, CA (US)

( * ) Notice: Subject to any disclaimer, the term of this patent is extended or adjusted under 35 U.S.C. 154(b) by 176 days.

(21) Appl. No.: 14/338,155

(22) Filed: Jul. 22, 2014

(65) Prior Publication Data

US 2016/0026742 A1   Jan. 28, 2016

(51) Int. Cl.
  *G06F 9/455* (2006.01)
  *G06F 17/50* (2006.01)
  *H03K 19/177* (2006.01)
  *G11C 5/02* (2006.01)

(52) U.S. Cl.
  CPC ...... *G06F 17/5068* (2013.01); *G06F 17/5054* (2013.01); *H03K 19/17728* (2013.01); *G06F 2217/66* (2013.01); *G11C 5/025* (2013.01)

(58) Field of Classification Search
  CPC .................. G06F 2216/11; G06F 2217/66
  See application file for complete search history.

(56) References Cited

U.S. PATENT DOCUMENTS

| 7,533,214 B2 * | 5/2009 | Aasheim | G06F 3/0619 711/103 |
| 2014/0040698 A1 * | 2/2014 | Loh | G06F 13/1668 714/758 |

* cited by examiner

*Primary Examiner* — Gary W Cygiel
(74) *Attorney, Agent, or Firm* — Kevin T. Cuenot

(57) ABSTRACT

An integrated circuit (IC) includes a bridge circuit configured to receive a first request from an external system, a discover circuit coupled to the bridge circuit and configured to process the first request received from the bridge circuit, and a memory map coupled to the discover circuit. The memory map stores a record for each of a plurality of Intellectual Property (IP) blocks implemented within the IC. The discover circuit is configured to generate a list of the IP blocks implemented within the IC from the records of the memory map responsive to the first request. The bridge circuit is configured to send the list to the external system.

20 Claims, 6 Drawing Sheets

US 9,639,646 B2

SYSTEM-ON-CHIP INTELLECTUAL PROPERTY BLOCK DISCOVERY

FIELD OF THE INVENTION

This disclosure relates to integrated circuits (ICs) and, more particularly, to discovering Intellectual Property blocks implemented within an IC.

BACKGROUND

Once developed, an integrated circuit (IC) may remain in service for an extended period of time. An IC may remain in service for years after design and testing is complete. Throughout the time that the IC remains in service, the provider and/or designer of the IC may need to provide various users with support services. This requires familiarity with the different circuits and systems implemented within the IC.

There may be several obstacles to supporting an IC throughout its lifecycle. One obstacle is that the persons responsible for supporting the IC may not be the same persons that originally designed the IC. In some cases, this is intended where different personnel are assigned to support functions than design functions. In other cases, this is an unintended consequence of attrition over the years.

Another obstacle is the potential unavailability of design files for the IC. In some cases, the original design files are either lost or not properly archived. In either case, the design files are not available to support personnel. In cases where support is provided by personnel not involved in the IC design, access to the design files may be critical. Even in the case where the original designers do provide support, the need for support may not arise for years after the original design is complete. As such, even the designers may need access to the design files to become re-acquainted with the details of the design.

SUMMARY

An integrated circuit (IC) includes a bridge circuit configured to receive a first request from an external system, a discover circuit coupled to the bridge circuit and configured to process the first request received from the bridge circuit, and a memory map coupled to the discover circuit. The memory map stores records for a plurality of Intellectual Property (IP) blocks implemented within the IC. The discover circuit is configured to generate a list of the plurality of IP blocks implemented within the IC from the records of the memory map responsive to the first request. The bridge circuit is configured to send the list to the external system.

An IC includes a processor configured to execute user program code, a discover circuit coupled to the processor and configured to receive a request from the processor, and a memory map coupled to the discover circuit. The memory map stores records for a plurality of IP blocks implemented within the IC. The discover circuit is configured to generate a list of the plurality of IP blocks implemented within the IC from the records of the memory map responsive to the request. The discover circuit is configured to send the list to the processor.

A method includes receiving, within an IC, a request for information from a requesting system. Responsive to the request, a memory map within the IC is read. The memory map stores records for a plurality of IP blocks implemented within the IC. The method includes generating a list of the plurality of IP blocks implemented within the IC from the memory map and sending the list to the requesting system.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular examples shown. Various aspects and advantages will become apparent upon review of the following detailed description in combination with the drawings.

DETAILED DESCRIPTION OF THE DRAWINGS

Figure 1:
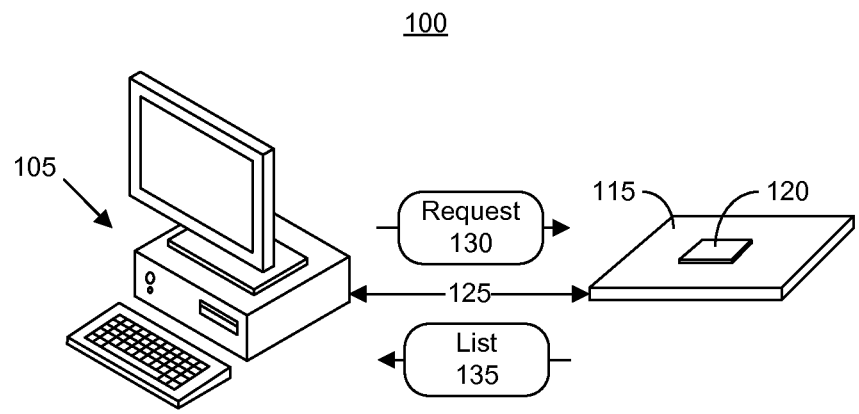
FIG. 1 is a block diagram illustrating an exemplary support environment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to discovering Intellectual Property (IP) blocks implemented within an IC. In accordance with the inventive arrangements described within this disclosure, an IC is configured to respond to communications from a requesting system. The requesting system may exist external to the IC or within the IC. The requesting system may request information about the particular IP blocks included within the IC. The IC may reply with the requested information. The IC may also provide additional information about the particular configuration of the IP blocks implemented within the IC. This allows the requesting system and any users thereof to determine which IP blocks are implemented within the IC by querying the IC itself and without having to consult design files for the IC.

The IC may also be configured to evaluate communications received from a requesting system that are intended for one or more IP blocks within the IC. The communications may be filtered, blocked, or otherwise processed. In some cases, the requesting system may be notified by the IC that a communication received by the IC from the requesting system is a non-conforming communication.

In addition, the IC may include security settings that define the type of information that may be included in the reply generated by the IC in response to the request from the requesting system. The security settings may be applied statically, dynamically, or using a combination for both static and dynamic approaches. For example, in some cases, a communication may be received requesting information relating to a particular IP block of the IC. In that case, a security setting may be applied to determine the response of the IC to the communication based upon an operating state of the particular IP block for which information is sought.

The inventive arrangements may be implemented within and/or used with any of a variety of different IC types. Exemplary IC types in which the inventive arrangements may be implemented include, but are not limited to, application specific ICs (ASICs), programmable ICs, system-on-chips (SOCs), or the like.

One example of a programmable IC is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect and programmable logic circuitries may be programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" includes, but is not limited to, these devices and further may encompass devices that are only partially programmable. For example, one type of programmable IC includes a combination of hard-coded transistor logic and a programmable switch fabric that programmably interconnects the hard-coded transistor logic.

An SOC type of IC includes a plurality of different systems within a single chip substrate. The systems, e.g., IP blocks and/or combinations of IP blocks, of the SOC are integrated to work cooperatively with one another. One example of an SOC is a chip level implementation of a computer or other data processing system. For example, the SOC may include a processor that executes program code such as an operating system and/or user applications. The processor operates cooperatively with one or more other on-chip systems. The on-chip systems may be digital circuits, analog circuits, mixed-signal circuits, or the like. Exemplary systems, or IP blocks, that may be included within an SOC and operate cooperatively with a processor may include, but are not limited to, wireless transceivers, signal processors, CODECs, memories, I/O peripherals, memory controllers, and the like.

The inventive arrangements described herein may be implemented as a method or process performed by an IC. In another aspect, the inventive arrangements may be implemented as a system, such as an IC or a system or circuitry implemented within an IC, configured to perform the various operations described within this disclosure.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary support environment (environment) 100. As pictured, environment 100 includes a data processing system 105. Data processing system 105, for example, may be implemented as a computer system or the like. Data processing system 105 is coupled to a target platform 115 through a communication link 125.

Target platform 115 may be implemented as a circuit board such as a printed circuit board having circuitry implemented thereon. Target platform 115 further may be included within a larger system. Target platform 115 may include a connector that couples to communication link 125. The connector may be coupled, using circuitry of target platform 115, to an IC 120. IC 120 is coupled to target platform 115 using a socket, a receptacle, another mounting technique such as soldering IC 120 directly to target platform 115, or the like. In any case, IC 120 couples to communication link 125 through target platform 115. In one aspect, IC 120 is a programmable IC. In another aspect, IC 120 is an SOC. IC 120 may implement user circuit designs that have incorporated therein, an Intellectual Property (IP) discovery system that may communicate with data processing system 105 via communication link 125.

As noted, data processing system 105 is coupled to target platform 115 through communication link 125. Communication link 125 may be implemented as any of a variety of different wired and/or wireless connections. Exemplary wired implementations of communication link 125 include, but are not limited to, point-to-point Ethernet, Universal Serial Interconnect (USB), FireWire (IEEE 1394 interface), or the like. Exemplary wireless implementations of communication link 125 include, but are not limited to, Bluetooth®, Wi-Fi®, or the like. In the case of a wireless implementation of communication link 125, the connector of target platform 115 may be implemented as a wireless transceiver. The exemplary communication links noted within this disclosure are provided for purposes of illustration only and not intended as limitations.

In operation, a user works through data processing system 105 and communicates with IC 120. Data processing system 105 is an example of an external system in reference to IC 120. Data processing system 105, for example, under the control of a user may send request 130 to IC 120. Request 130 may be a request for information about the particular IP blocks included or implemented within IC 120. In response to request 130, IC 120 may respond with a reply specifying a list 135 of the particular IP blocks implemented within IC 120. List 135 may include address information for the IP blocks, configuration information for the IP blocks, and the like. List 135 is generated subject to security settings in place within IC 120. Further aspects will be described with reference to the remaining drawings.

Figure 2:
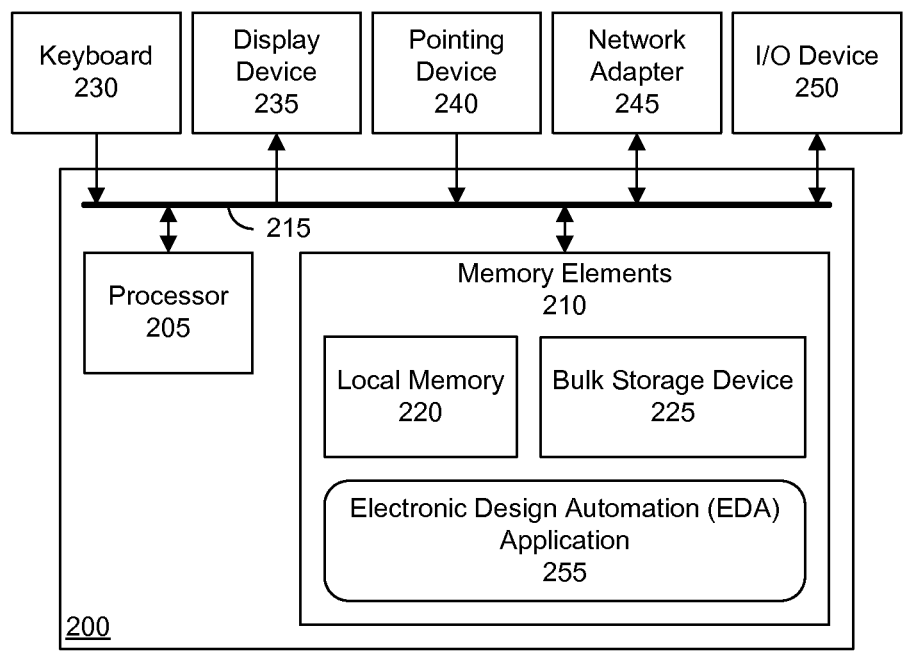
FIG. 2 is a block diagram illustrating an exemplary data processing system.

FIG. 2 is a block diagram illustrating an exemplary architecture 200 for data processing system 105 of FIG. 1. Architecture 200 includes at least one processor 205, e.g., a central processing unit (CPU), coupled to memory elements 210 through a system bus 215 or other suitable circuitry. Architecture 200 stores program code, e.g., electronic design automation (EDA) application 255, within memory elements 210. Processor 205 executes the program code accessed from memory elements 210 via system bus 215. In one aspect, architecture 200 may be used to implement a computer or other data processing system that is suitable for storing and/or executing program code. It should be appreciated, however, that architecture 200 may be used to implement any system including a processor and memory that is capable of performing the functions described within this disclosure.

Memory elements 210 include one or more physical memory devices such as, for example, a local memory 220 and one or more bulk storage devices 225. Local memory 220 may be implemented as a random access memory (RAM) or other non-persistent memory device(s) generally used during actual execution of the program code. Bulk storage device 225 may be implemented as a hard disk drive (HDD), solid state drive (SSD), or other persistent data storage device. Architecture 200 also may include one or more cache memories (not shown) that provide temporary storage of at least some program code in order to reduce the number of times program code must be retrieved from the bulk storage device during execution.

Input/output (I/O) devices such as a keyboard 230, a display device 235, and a pointing device 240 optionally may be coupled to architecture 200. The I/O devices may be coupled to architecture 200 either directly or through intervening I/O controllers. A network adapter 245 may also be coupled to architecture 200 to enable a system implemented using architecture 200 to become coupled to other systems, computer systems, remote printers, remote storage devices, and/or target platform 115 of FIG. 1 through intervening private or public networks. Modems, cable modems, Ethernet cards, and wireless transceivers are examples of different types of network adapter 245 that may be used with architecture 200. An input/output (I/O) device 250 such as a USB port, a FireWire port, or the like also may be coupled to architecture 200 to allow a system implemented using architecture 200 to become coupled to another system such as any of the aforementioned systems including target platform 115 of FIG. 1.

Memory elements 210 store EDA application 255. In one aspect, EDA application 255 may include one or more different components or modules. EDA application 255, being implemented in the form of executable program code, is executed by architecture 200. As such, EDA application 255 is considered an integrated part of any system implemented using architecture 200. Architecture 200, while executing EDA application 255, communicates with target platform 115 of FIG. 1. EDA application 255 and any data items used, generated, and/or operated upon by architecture 200 while executing EDA application 255 are functional data structures that impart functionality when employed as part of architecture 200.

Figure 3:
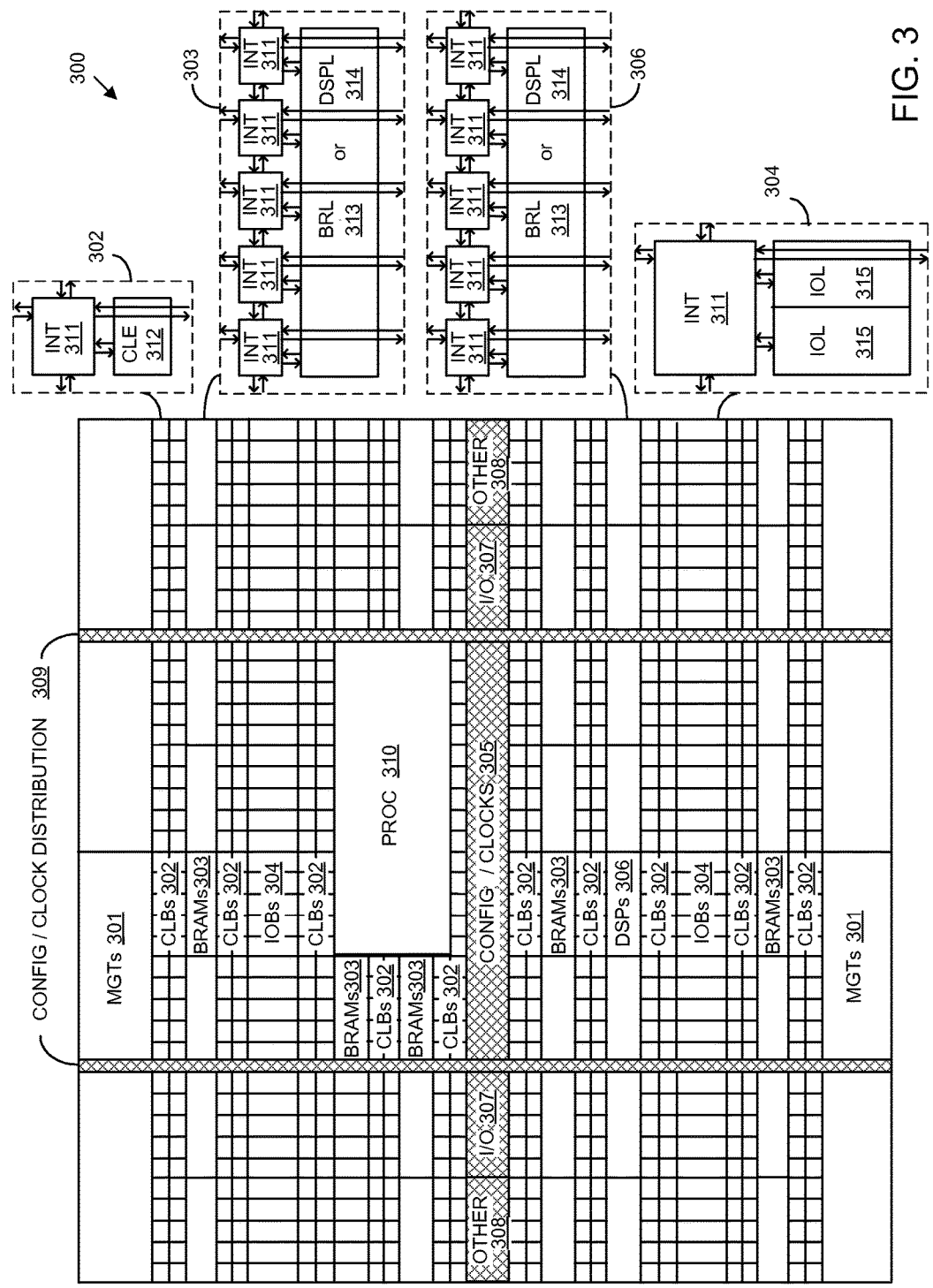
FIG. 3 is a block diagram illustrating an exemplary architecture for an integrated circuit.

FIG. 3 is a block diagram illustrating an exemplary architecture 300 for an IC. For example, architecture 300 may be used to implement IC 120 of FIG. 1. In one aspect, architecture 300 is implemented within a field programmable gate array (FPGA) type of IC. Architecture 300 is also representative of an SOC type of IC. As noted, an SOC is an IC that includes a processor that executes program code, e.g., user program code, and one or more other circuits and/or circuit systems. The circuits and/or circuit systems may operate cooperatively with one another and with the processor.

As shown, architecture 300 includes several different types of programmable circuit, e.g., logic, blocks. For example, architecture 300 may include a large number of different programmable tiles including multi-gigabit transceivers (MGTs) 301, configurable logic blocks (CLBs) 302, random access memory blocks (BRAMs) 303, input/output blocks (IOBs) 304, configuration and clocking logic (CONFIG/CLOCKS) 305, digital signal processing blocks (DSPs) 306, specialized I/O blocks 307 (e.g., configuration ports and clock ports), and other programmable logic 308 such as digital clock managers, analog-to-digital converters, system monitoring logic, and so forth.

In some ICs, each programmable tile includes a programmable interconnect element (INT) 311 having standardized connections to and from a corresponding INT 311 in each adjacent tile. Therefore, INTs 311, taken together, implement the programmable interconnect structure for the illustrated IC. Each INT 311 also includes the connections to and from the programmable logic element within the same tile, as shown by the examples included at the top of FIG. 3.

For example, a CLB 302 can include a configurable logic element (CLE) 312 that may be programmed to implement user logic plus a single INT 311. A BRAM 303 may include a BRAM logic element (BRL) 313 in addition to one or more INTs 311. Typically, the number of INTs 311 included in a tile depends on the height of the tile. As pictured, a BRAM tile has the same height as five CLBs, but other numbers (e.g., four) may also be used. A DSP tile 306 may include a DSP logic element (DSPL) 314 in addition to an appropriate number of INTs 311. An 10B 304 may include, for example, two instances of an I/O logic element (IOL) 315 in addition to one instance of an INT 311. As will be clear to those of skill in the art, the actual I/O pads connected, for example, to IOL 315 typically are not confined to the area of IOL 315.

In the example pictured in FIG. 3, a columnar area near the center of the die, e.g., formed of regions 305, 307, and 308, may be used for configuration, clock, and other control logic. Horizontal areas 309 extending from this column are used to distribute the clocks and configuration signals across the breadth of the programmable IC.

Some ICs utilizing the architecture illustrated in FIG. 3 include additional logic blocks that disrupt the regular columnar structure making up a large part of the IC. The additional logic blocks may be programmable blocks and/or dedicated circuitry. For example, a processor block depicted as PROC 310 spans several columns of CLBs and BRAMs.

In one aspect, PROC 310 is implemented as a dedicated circuitry, e.g., as a hard-wired processor, that is fabricated as part of the die that implements the programmable circuitry of the IC. PROC 310 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 310 is omitted from architecture 300 and replaced with one or more of the other varieties of the programmable blocks described. Further, such blocks may be utilized to form a "soft processor" in that the various blocks of programmable circuitry may be used to form a processor that executes program code as is the case with PROC 310.

The phrase "programmable circuitry" means programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 3 that are external to PROC 310 such as CLBs 302 and BRAMs 303 are considered programmable circuitry of the IC. Programmable circuitry may be configured or programmed to implement different physical circuits therein.

In general, the functionality of programmable circuitry is not established until configuration data is loaded into the IC. A set of configuration bits may be used to program programmable circuitry of an IC such as an FPGA. The configuration bit(s) are typically referred to as a "configuration bitstream." In general, programmable circuitry is not operational or functional without first loading a configuration bitstream into the IC. The configuration bitstream effectively implements or instantiates a particular physical circuit within the programmable circuitry. The configuration bitstream or circuit design specifies, for example, functional aspects of the programmable circuit blocks and physical connectivity among the various programmable circuit blocks that is otherwise non-existent.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry has dedicated circuit blocks and interconnects, for example, that are functional without first loading a configuration bitstream into the IC. An example of hardwired circuitry is PROC 310.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

FIG. 3 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 3 are purely exemplary. In an actual IC, for example, more than one adjacent column of CLBs may be included wherever the CLBs appear, to facilitate the efficient implementation of a user circuit design. The number of adjacent CLB columns, however, may vary with the overall size of the IC. Further, the size and/or positioning of blocks such as PROC 310 within the IC are for purposes of illustration only and are not intended as a limitation.

Figure 4:
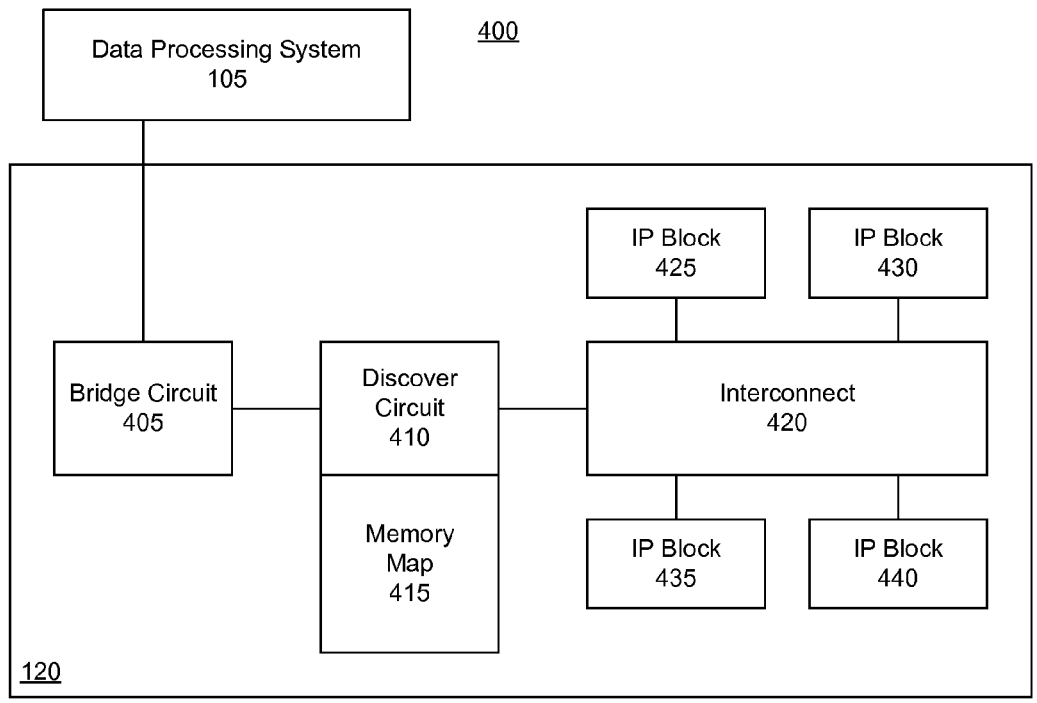
FIG. 4 is a block diagram illustrating an exemplary Intellectual Property (IP) block discovery system.

FIG. 4 is a block diagram illustrating an exemplary IP discovery system (system) 400. System 400 is implemented within IC 120. In one aspect, system 400 is implemented as hard-wired circuitry within IC 120. In another aspect, system 400 is implemented using the programmable circuitry available within IC 120. In still another aspect, system 400 may be implemented as a combination of hard-wired circuitry and programmable circuitry. System 400 includes a bridge circuit 405, a discover circuit 410, and a memory map 415.

Bridge circuit 405 is configured to translate communications between a first communication protocol utilized by data processing system 105 and a second communication protocol utilized within IC 120 and by discover circuit 410. Bridge circuit 405 may be implemented as a hard-wired circuit block. In one aspect, data processing system 105 communicates with IC 120 using the protocol specified by the Joint Test Action Group (JTAG), also known as the IEEE 1149.1 Standard Test Access Port and Boundary-Scan Architecture. Other exemplary communication protocols that may be used by data processing system 105 to communicate with IC 120 may include Ethernet, Boundary Scan (BSCAN), Peripheral Component Interconnect Express (PCI Express), or the like. IP blocks implemented within IC 120 may utilize a different communication protocol such as one intended for intra-IC communications. In one aspect, discover circuit 410 communicates using one of the Advanced eXtensible Interface (AXI) protocols, e.g., AXI3, AXI4, AXI4-Lite, AXI4-Stream, etc., as specified within one or more of the various AMBA® interface specifications available from ARM® Ltd.

The protocols provided within this disclosure are provided for purposes of illustration only. Those skilled in the art will recognize that other communication protocols may be used in place of the examples provided. In this regard, the inventive arrangements described herein are not intended to be limited to the examples provided. Bridge circuit 405 may be adapted to perform translations between any of a variety of different communications protocols.

Accordingly, bridge circuit 405 receives requests from an external system such as data processing system 105 that are formatted in a first communication protocol. Bridge circuit 405 translates the received request into a translated request specified in the second communication protocol utilized by discover circuit 410. Bridge circuit sends the translated request to discover circuit 410 for processing.

Discover circuit 410 is configured to process translated requests received from bridge circuit 405. In general, discover circuit 410 consults, or reads, memory map 415 in generating a reply to the received request. In some cases, discover circuit 410 reads information from memory map 415 and includes the information, or portions thereof, within a reply that is sent from discover circuit 410 to bridge circuit 405. In processing the received request, discover circuit 410 further may read security settings from memory map 415 to determine the content to be included within the reply generated in response to the request.

As pictured, IC 120 includes an interconnect 420. In one aspect, interconnect 420 is an AXI compliant interconnect, but may be any known IC interconnection technology. Interconnect 420 is coupled to discover circuit 410, IP block 425, IP block 430, IP block 435, and IP block 440. Each of IP blocks 420, 425, 430, and 435 is a circuit block, i.e., circuitry, that performs a particular function. In one aspect, each of IP blocks 420, 425, 430, and 435 may be implemented from an IP core. Each of IP blocks 420, 425, 430, and 435 may be implemented as circuitry within the programmable circuitry of IC 120. In this regard, IP blocks 420, 425, 430, and 435 may not be configured to respond to requests for information and may not be configured to execute user-specified program code.

Memory map 415 is a memory that stores information about the various IP blocks 425, 430, 435, and 440 implemented within IC 120. Memory map 415 stores one or more records. Each record may be associated with one of IP blocks 425, 430, 435, and 440. For example, a one-to-one relationship may exist between records stored in memory map 415 and IP blocks 425, 430, 435, and 440. In one aspect, memory map 415 may be generated automatically by a system such as an EDA application used to design IC 120 or IP blocks implemented therein.

In one aspect, the request received from data processing system 105 that is translated and provided to discover circuit 415 is a request for information about the IP blocks that are included or implemented within IC 120. Discover circuit 410 responds to the request using data read from records of memory map 415 subject to any security settings that may be specified in the records. With records corresponding to IP blocks on a one-to-one basis, the security settings defining the content of the reply from discover circuit 410 may be applied on a per-IP block basis.

Discover circuit 410 includes the requested information within a reply that is generated and provided to bridge circuit 405. The reply is formatted using the second communication protocol. Bridge circuit 405 translates the reply provided from discover circuit 410 from the second communication protocol to the first communication protocol. Bridge circuit 405 sends the translated reply to data processing system 105.

Figure 5:
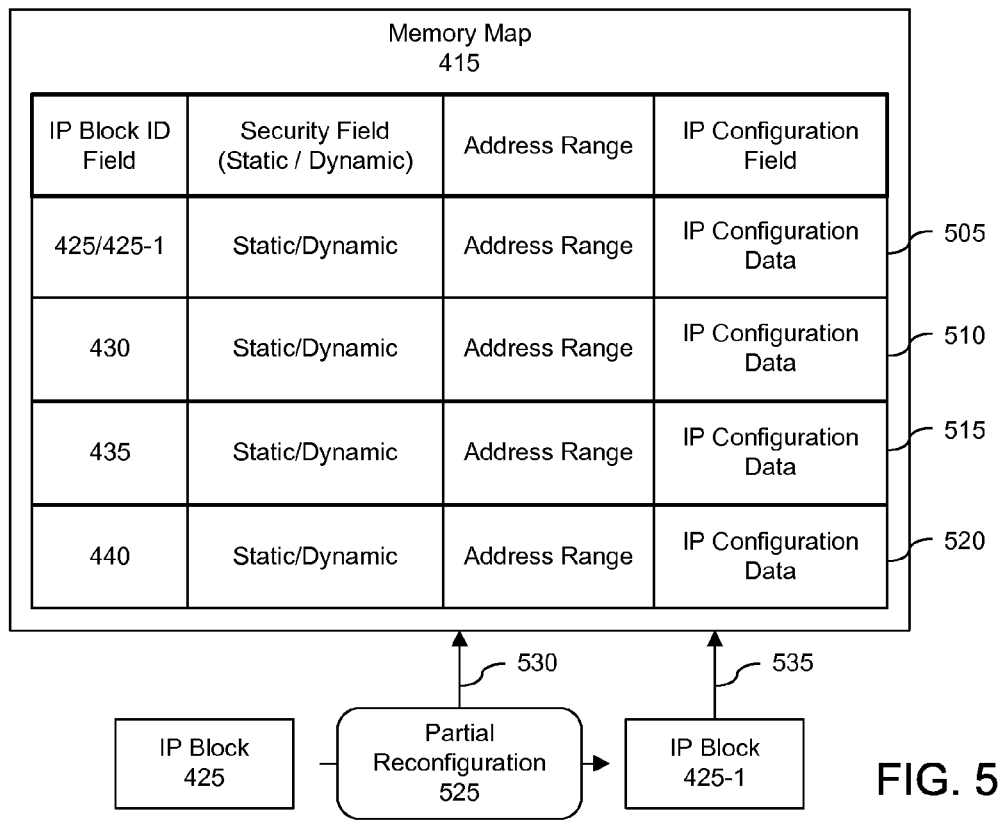
FIG. 5 is a block diagram illustrating a more detailed example of the memory map of FIG. 4.

FIG. 5 is a block diagram illustrating a more detailed example of memory map 415 of FIG. 4. FIG. 5 shows exemplary records 505, 510, 515, and 520 stored in memory map 415. As pictured, each record includes an IP Block identifier (ID) field, a security field, an address range field, and an IP configuration field. In one aspect, memory map 415 stores one record for each IP block that is included, or implemented within IC 120. As pictured, record 505 is for IP block 425. Record 510 is for IP block 430. Record 515 is for IP block 435. Record 520 is for IP block 440.

The IP block ID field stores an IP block ID. The IP block ID may be a numeric reference, a core name, or other identifying information for the particular IP block associated with the record and implemented within IC 120. In one aspect, the IP block ID may uniquely identify the instance of the IP block within IC 120, for example, where IC 120 includes multiple instances of a same IP block.

The security field stores a plurality of security bits. The security bits, taken collectively, specify a security setting for the IP block. In one aspect, the security bits, or security setting, may include a static security setting and a dynamic security setting. The static security setting is determined and set at design time of the circuit design. The dynamic security setting may be changed or updated during runtime, i.e., during operation of IC 120 and/or the associated IP block.

The static security setting overrides the dynamic security setting. The static security setting, for example, may specify "allowed," "restricted," or "conditionally restricted." "Allowed" means that discover circuit 410 may provide information from the record to a requesting system. Allowed may also mean that discover circuit 410 will allow a system, e.g., an external system, to communicate directly with the associated IP block if supported by that IP block.

"Restricted" means that discover circuit 410 does not provide any information about the associated IP block to a requesting system. Restricted further may mean that discover circuit 410 will not allow any communication between a requesting system, e.g., the external system, and the associated IP block. In a further aspect, the static security setting may specify read and/or write privileges for one or more or all portions of the record thereby specifying, with particularity, which fields or bits of fields, of the record may be written and/or read and by which requesting entity.

As an example, consider the case where IP block 425 is an encryption circuit block. In that case, the static security setting of record 505 restricts access of any kind to IP block 425. The static security setting will prevent discover circuit 410 from providing any information about the existence of IP block 425 to external systems. For example, any listing of IP blocks implemented within IC 120, as provided by discover circuit 410 to an external system and/or another requesting system, will omit any information about IP block 425. Discover circuit 410, for example, does not provide any indication that IP block 425 is even implemented within IC 120. Similarly, the static security setting will cause discover circuit 410 to prevent any attempted access of IP block 425 by an external system and/or by another requesting system.

"Conditionally restricted" means that discover circuit 410 may provide information, or selected information, about IP block 425 to external systems and/or other requesting systems under certain circumstances defined within the dynamic security setting. Conditionally restricted may further mean that discover circuit 410 may allow and/or restrict communication between an external system and/or other requesting system and IP block 425 under particular circumstances defined by the dynamic security setting.

Dynamic security settings may be changed during runtime, i.e., during operation of IC 120 and/or the associated IP block. Dynamic security settings may be the same as, or similar to, static security settings. As noted, however, the static security setting of a record overrides the dynamic security setting of the record. In one aspect, the static security setting may specify conditionally restricted with the dynamic security setting specifying the particular conditions that must be met in order for an external system and/or other requesting system to access one or more portions of the record or access the IP block itself.

The dynamic security setting may be modified during runtime of IC 120. In one aspect, the particular IP block associated with the record may update the dynamic security setting. In illustration, IP block 425 may be configured to update the dynamic security setting of record 505 to specify when IP block 425 is available and when not available for communicating with an external system. For example, IP block 425 may enter a particular operating mode for handling critical operations. Responsive to entering that operational mode within IC 120, IP block 425 may update the dynamic security setting of record 505 to indicate a "do not disturb" mode when the static security setting specifies conditionally restricted. Upon exiting the particular operating mode or completing the critical transaction, IP block 425 again may update the dynamic security setting of record 505 to indicate that IP block 425 may be accessed.

In another example, the static security setting may indicate conditionally restricted and the dynamic security setting may specify that the external system has read only access to record 505 unless the external system and/or other requesting system provides a key. Responsive to providing the key, the external system and/or other requesting system may write to record 505, or selected portions, fields, or bits of record 505, and possibly configure IP block 425.

The address range field specifies a range of valid addresses for the associated IP block. The address range may be specified in any of a variety of different ways. In one aspect, the address range field stores a base address indicating the starting address of the range and an offset indicating the ending address of the range. In another aspect, the address range field specifies the starting address and the ending address of the address range. The address(es) specified within the address range field may be specified as Internet Protocol (IP) addresses. Having acquired the range of valid addresses for an IP block, a requesting system, whether external or not, may, in some cases, communicate directly with the IP block.

The IP configuration field stores IP configuration data. In one aspect, the IP configuration data may be, or include, a string or other data describing one or more aspects of the implementation of the associated IP block within IC 120 that otherwise may not be visible or ascertainable either off-chip or on-chip. The IP configuration data stored in the IP configuration field is known at design time, but would not be accessible or determinable at runtime without storing such data within the IP configuration field of a record.

As an example, consider the case in which IP block 425 is a monitoring circuit block within IC 120. The IP configuration data for IP block 425 stored within record 505 may indicate the particular components, or nodes, within IC 120 that are monitored by IP block 425. Further, the IP configuration data may specify one or more settings, etc., of the monitoring circuit block such as the type of events being detected, etc. In a further aspect, the IP configuration data may specify particular comments or other text from a designer of IC 120 or IP block 425, that may be output by discover circuit 410.

It should be appreciated that the IP configuration data is not equivalent to configuration data that is stored in configuration memory cells of a programmable IC to configure or implement a circuit design and/or IP blocks within IC 120. The IP configuration field of records within memory map 415 does not dictate operational parameters of IP blocks. The IP configuration data is stored so that a system may query and receive such data from IC 120 despite the actual IP block being unable to output such information. Further, IP configuration data stored in memory map 415 may be in human readable form.

FIG. 5 illustrates another aspect of memory map 415. In the case of a programmable IC such as an FPGA, one or more regions of programmable circuitry may be dynamically reconfigured to implement a different circuit block than was previously implemented within the region. The remainder of IC 120 may continue to operate while the reconfiguration of the region takes place.

For example, IP block 425 may be a monitor circuit block. IC 120 may undergo a partial reconfiguration process 525 in which the region of IC 120 that implements IP block 425 is re-configured by loading a partial configuration bitstream into the configuration memory cells controlling programmable circuitry of the region. The partial configuration bitstream causes the programmable circuitry in the region to implement IP block 425-1, which may be an encryption or other different circuit block. IP block 425-1 is an entirely different physical circuit than IP block 425, though various aspects such as input ports, output ports, and address range may remain the same.

In implementing IP block 425-1 in place of IP block 425, record 505 must be updated to indicate correct information for IP block 425-1 instead of IP block 425. In one aspect, the partial configuration bitstream used to implement IP block 425-1 may specify the information needed to update record 505. This process is indicated by arrow 530. In another aspect, IP block 425-1, once implemented within IC 120, may communicate with discover circuit 410 and update record 505 with the correct information for IP block 425-1 as indicated by arrow 535.

Partial reconfiguration of IC 120 is illustrative of a scenario where even if a user has access to design documents for IC 120, the user may not be aware of the particular IP blocks implemented within IC 120 as a consequence of partial reconfiguration during operation of IC 120. Providing an external system and/or other requesting system with query capability to ask for a listing of IP blocks currently implemented within IC 120 and other information about the IP blocks, subject to security settings, allows the systems and user to compile a list of IP blocks implemented within IC 120 at any given time.

Figure 6:
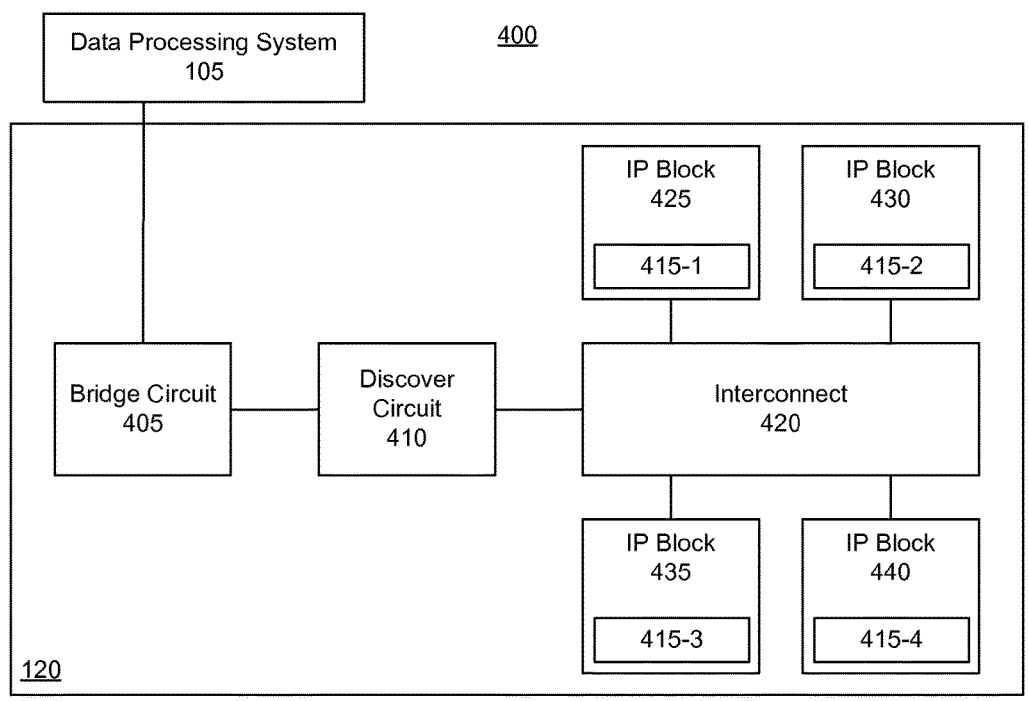
FIG. 6 is a block diagram illustrating another exemplary implementation of the IP block discovery system of FIG. 4.

FIG. 6 is a block diagram illustrating another exemplary implementation of system 400. System 400 may be implemented substantially similar to the implementation described with reference to FIG. 4. Within FIG. 6, memory map 415 is implemented as a plurality of distributed memory elements labeled 415-1, 415-2, 415-3, and 415-4. FIG. 6 illustrates an implementation where each of IP blocks 425, 430, 435, and 440 includes a respective memory map element 415-1, 415-2, 415-3, and 415-4. Each individual memory map element stores a record for the IP block in which that memory map element is contained.

Referring to FIG. 6, interconnect 420 may be implemented as an interconnect bus that includes a dedicated line for discovery. Discover circuit 410, for example, may send or assert a signal on the dedicated line which is a request for information from the various IP blocks coupled to interconnect 420.

Accordingly, rather than accessing a centralized and unified memory map as illustrated in FIG. 4, discover circuit 410 must query each of IP blocks 425 to determine information in order to respond to a request from an external system and/or another requesting system. In one aspect, any IP blocks storing a record having a restricted static security setting would not respond to a query issued from discover circuit 410. Without receiving a response from an IP block, discover circuit 410 would have no knowledge of the existence of that IP block and, as such, not be able to provide any information to an external system or other system requesting information about the restricted IP block. IP blocks may conditionally respond to a query from discover circuit 410 in the case where the static security setting indicates conditionally restricted and the conditions specified in the dynamic security setting are met.

Figures 7, 8:
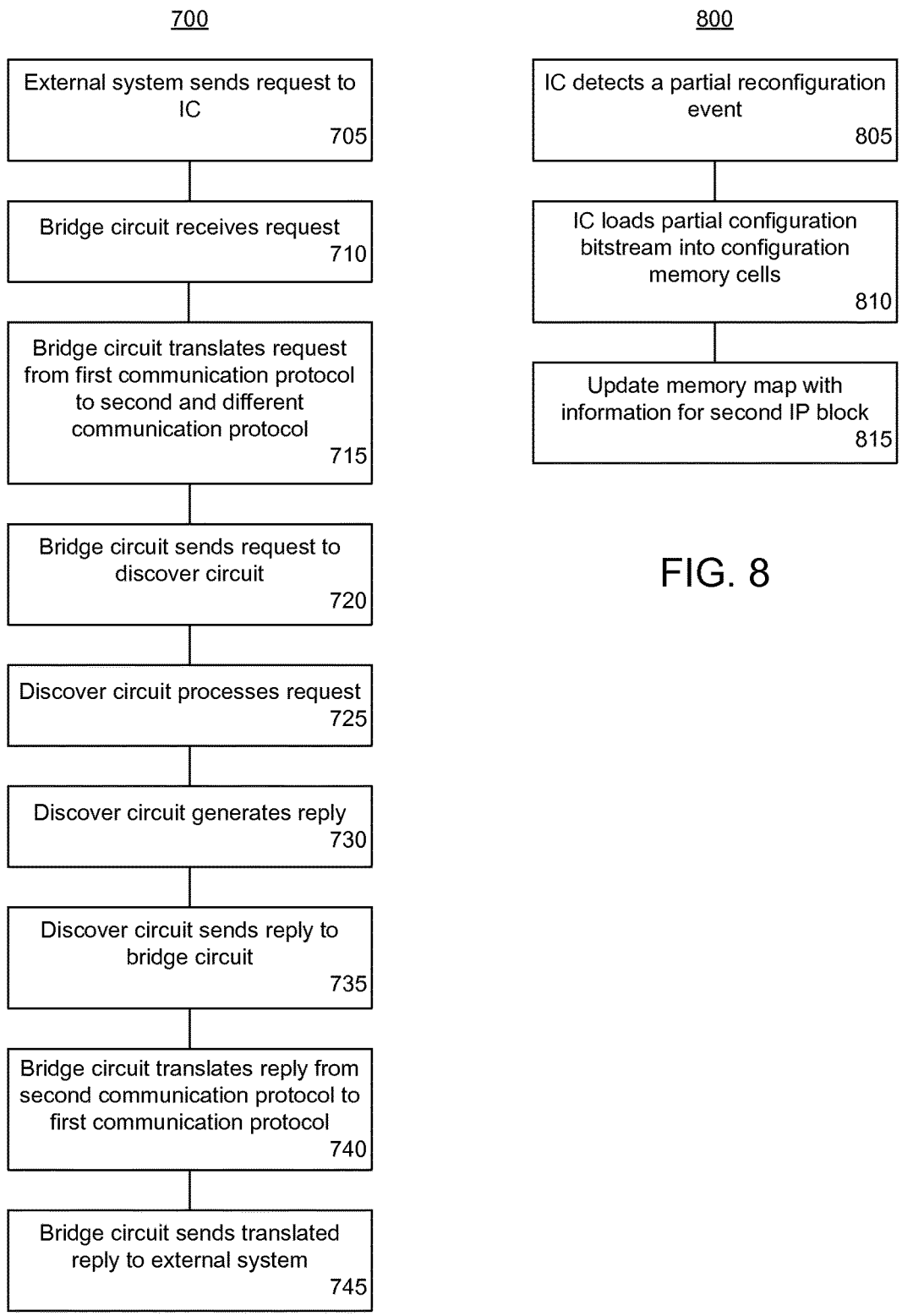
FIG. 7 is a flow chart illustrating an exemplary method of IP block discovery.
FIG. 8 is a flow chart illustrating another exemplary method of IP block discovery.

FIG. 7 is a flow chart illustrating an exemplary method 700 of IP block discovery. Method 700 may be implemented by the environment described with reference to FIG. 1.

In block 705, the external system sends a request to the IC within the target platform. The request is formatted using a first communications protocol. In one aspect, the request is for a list or inventory of IP blocks implemented within the IC. In another aspect, the request is a communication directed to a particular IP block implemented within the IC. When directed to a particular IP block, the request may include an address of the particular IP block to which the request is directed also referred to as the "intended IP block."

In block 710, the bridge circuit receives the request sent from the external system. In block 715, the bridge circuit translates the request from the first communication protocol to a second and different communication protocol. The second communication protocol is one that is used within the IC and, in particular, by the discover circuit. In block 720, bridge circuit sends the request to the discover circuit. More particularly, the bridge circuit sends the translated request to the discover circuit.

In block 725, the discover circuit processes the request or the translated version of the request. In the case where the request asks for a listing of IP blocks within the IC and the memory map is unified and centralized, the discover circuit reads the memory map and collects data from the records contained therein. The data collected from the records is collected in accordance with, or subject to, the security settings specified within each respective record.

For example, the discover circuit collects no information for a record having a restricted static security setting. The discover circuit collects information from a record having an allowed static security setting. For any records having a conditionally restricted static security setting, the discover circuit collects information based upon whether the conditions specified within the dynamic security setting have been met.

In the case where the translated request asks for a listing of IP blocks within the IC and the memory map is distributed among the IP blocks, the discover circuit issues a query to the IP blocks and collects responses. Accordingly, the information collected by the discover circuit includes only that information which is provided from the various IP blocks. An IP block having a static security setting of restricted, for example, may not provide any response to the discover circuit. And IP block having a static security setting of conditionally restricted and a dynamic security setting specifying conditions that have not been met will also not respond.

Whether the memory map is unified and centralized or distributed, the discover circuit collects only information for IP blocks having a static security setting of allowed and for IP blocks having a static security setting of conditionally restricted paired with a dynamic security setting specifying conditions that have been met.

In the case where the translated request is a communication directed to a particular IP block within the IC, the discover circuit compares the address for the intended IP block specified within the request with addresses range specified within the records of the memory map. If the address within the translated request does not fall within any address range specified within the memory map, the discover circuit may discard the translated request thereby preventing the intended IP block from receiving the translated request.

If the address within the translated request is within an address range of a record having a static security setting of allowed, the discover circuit allows the request to pass to the intended IP block. If the address within the translated request is within an address range of a record having a static security setting of restricted, the discover circuit may discard the translated request despite the determination of a valid address. If the address of the translated request is within an address range of a record having a static security setting of conditionally restricted and a dynamic security setting specifying conditions that have been met, the translated request is passed on to the intended IP block. Appreciably, if the conditions of the dynamic security setting are not met, the translated request is not passed on to the intended IP block despite the determination of a valid address.

In block 730, the discover circuit generates a reply. The reply is formatted using the second communication protocol. In the case where the translated request asks for a listing of IP blocks included within the IC, the reply may specify the collected information from the various records of the memory map as previously described. For each IP block on the list, the reply may specify the IP block ID, the address range, and the IP configuration data from the record of the IP block. In the case where the translated request is a communication to a particular IP block, the reply may indicate that the request was not provided to the intended IP block. In some cases, however, the discover circuit may not send a reply responsive to discarding a received translated request. In still other cases, where the translated request is passed on to the intended IP block, the reply may be a response sent from the intended IP block that is simply passed on by the discover circuit.

In block 735, the discover circuit sends the reply to the bridge circuit. In block 740, the bridge circuit translates the reply from the second communication protocol to the first communication protocol. In block 745, the bridge circuit sends the translated reply to the external system. In the case where the request asked for a listing of IP blocks in the IC, the external system is furnished with the listing or an inventory of the various IP blocks implemented within the IC at the time that the request was received. As discussed, the list is compliant with the security settings in place on a per-IP block basis.

FIG. 8 is a flow chart illustrating an exemplary method 800 of IP block discovery. Method 800 may be implemented by the environment described with reference to FIG. 1. Method 800 illustrates scenario where one, or more, IP blocks implemented within the IC are updated or changed to implement different IP blocks using partial reconfiguration.

For example, a first IP block is to be replaced with a second and different IP block. The first IP block occupies a first physical region within the IC. Through partial reconfiguration, the second IP block is implemented within the first physical region thereby replacing physical circuitry of the first IP block with physical circuitry of the second IP block.

In one aspect, partial reconfiguration may be performed while one or more or all other IP blocks and/or systems of the IC are off-line. In another aspect, however, partial reconfiguration may be performed while one or more or all other IP blocks and/or systems of the IC except the region being reconfigured continue to operate. Partial reconfiguration may be initiated or triggered by an event originating within the IC and detected within the IC. Partial reconfiguration also may be initiated by the IC responsive to a message or signal received by the IC from another system such as the external system.

In any case, in block 805, the IC detects a partial reconfiguration event. In block 810, the IC loads a partial configuration bitstream into configuration memory cells of the IC. A programmable IC typically includes a configuration controller that is responsible for receiving a partial configuration bitstream from a source such as an external memory or external system, and load the partial configuration bitstream into the appropriate configuration memory cells. The configuration controller is a controller or processor that is dedicated to configuration and/or reconfiguration operations, i.e., loading a configuration bitstream or a partial configuration bitstream into configuration memory cells. As such, the configuration controller is distinct from the processor within the IC that is available to execute user program code.

In block 815, the memory map is updated with information for the second IP block. More particularly, the record of the memory map for the first IP block is updated and/or overwritten with information for the second IP block. The record may be updated in any of a variety of different ways.

In one aspect, the partial configuration bitstream includes or specifies the information for the second IP block that is to be written to the record of the memory map for the first IP block. In that case, as the partial configuration bitstream is written to the memory cells, the information for the second IP block is also written to the appropriate locations in the memory map by the configuration controller thereby updating the record for the first IP block to specify information for the second IP block. Including information for the memory map within the partial configuration bitstream may be used whether the memory map is implemented in a unified manner or distributed among the IP blocks.

In another aspect, the second IP block, once implemented within the IC, updates the memory map. In that case, the second IP block communicates with the discover circuit, provides information to be used in updating the record of the memory map to the discover circuit, and requests that the discover circuit update the record using the provided information.

Figure 9:
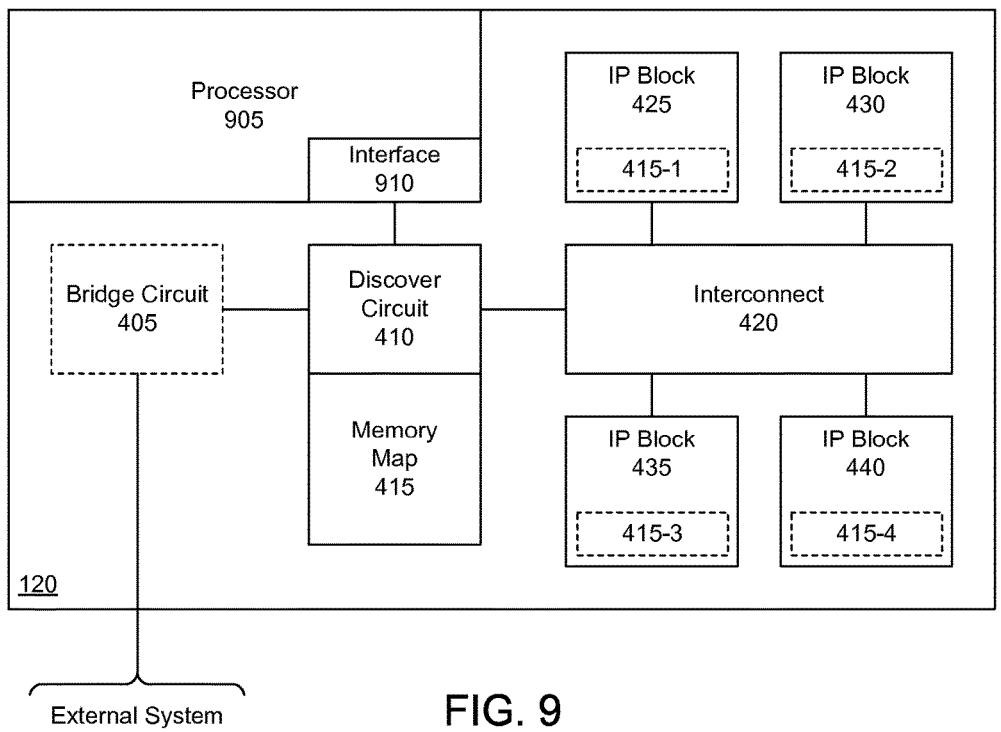
FIG. 9 is a block diagram illustrating another exemplary implementation of the IP block discovery system of FIG. 4.

FIG. 9 is a block diagram illustrating another exemplary implementation of system 400. System 400 may be implemented substantially similar to the implementation described with reference to FIG. 4 and/or FIG. 6. Within FIG. 9, memory map 415 may be implemented as a single, unified memory structure. In an alternative implementation, memory map 415 may be implemented as a plurality of distributed memory elements labeled 415-1, 415-2, 415-3, and 415-4 shown using dashed lines where each of IP blocks 425, 430, 435, and 440 includes a respective memory map element 415-1, 415-2, 415-3, and 415-4.

The implementation of FIG. 9 includes a processor 905 that may be included within IC 120. In one aspect, processor 905 may be implemented as a hard-wired processor as described with reference to PROC 310 of FIG. 3. Referring to FIG. 9, processor 905 includes an interface 910 that is coupled to discover circuit 410. Interface 910 may be implemented an AXI compliant interface. FIG. 9 illustrates an example where a processor included within IC 120 is able to query discover circuit 410 for a list of IP blocks implemented within IC 120.

System 400 may operate substantially as described with reference to FIGS. 4 and 6, with the exception that requests for IP blocks may be generated and sent to discover circuit 410 by processor 905. The reply generated by discover circuit 410 is provided to processor 905 via interface 910. The implementation described with reference to FIG. 9 is an example in which IC 120 and, in particular, processor 905, is able to conduct a self-discovery process.

One or more of IP blocks 425, 430, 435, and/or 440 may be replaced by a different IP block, or blocks, through a partial re-configuration process as described within this disclosure. Processor 905 may query discover circuit 410 from time to time, responsive to a partial re-configuration event detected therein, at particular points specified within user program code executed by processor 905, etc., for a list of IP blocks implemented within IC 120. In this manner, processor 905 is able to maintain an updated list of IP blocks implemented within IC 120. The particular IP blocks implemented within IC 120, as determined by discover circuit 410 and provided to processor 905, may be used to determine particular processing to be performed, select branches or paths of execution within user program code executed by processor 905, determine which operations may be offloaded from processor 905 to one or more of the IP blocks implemented within IC 120, or the like.

In one aspect, discover circuit 410 may utilize the various security mechanisms previously described when formulating a response to processor 905. In another aspect, since the information requested by processor 905 is remaining within IC 120, one or more security mechanism may be bypassed or ignored. For example, processor 905 may obtain a list of IP blocks regardless of the security setting of the records for the IP blocks.

Within FIG. 9, bridge circuit 405 is shown with dashed lines to indicate that bridge circuit 405 is optional. If included, bridge circuit 405 may communicate with an external system as previously described. In that case, discover circuit 410 may respond to queries from an external system as well as from processor 905.

In the case where bridge circuit 405 is included and system 400 may receive requests from an external system and/or from processor 905, each record may include a security setting that includes a static security setting applied for requests received from external systems and a static security setting applied for requests from processor 905. The two static security settings are independent. Thus, the two static security settings may be the same or different. Similarly, the security setting for each record may specify a dynamic security setting applied for requests received from external systems and a dynamic security setting applied for requests from processor 905. The two dynamic security settings are independent. Thus, the two dynamic security settings may be the same or different. It should be appreciated, however, that the static security setting for external systems would be referenced in combination with the dynamic security setting for external systems. Likewise, the static security setting for processor 905 would be referenced in combination with the dynamic security setting for processor 905.

Figure 10:
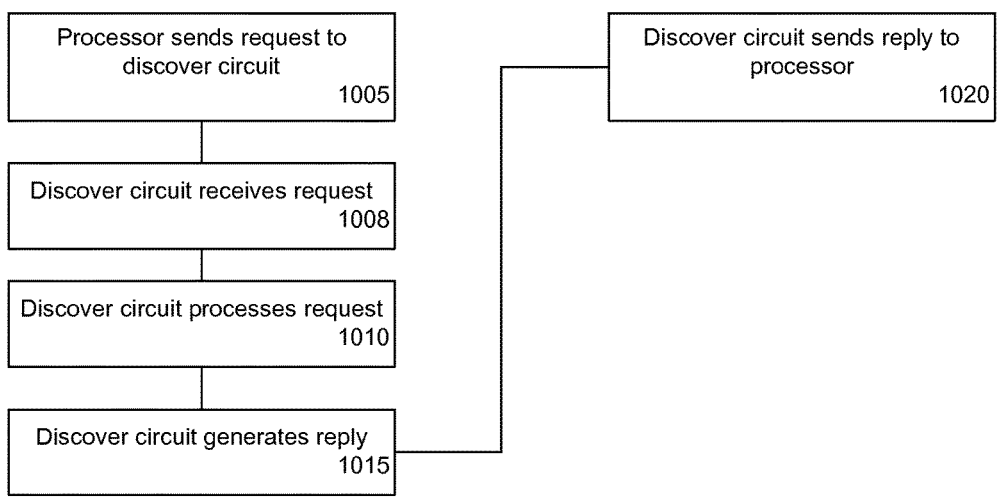
FIG. 10 is a flow chart illustrating another exemplary method of IP block discovery.

FIG. 10 is a flow chart illustrating an exemplary method 1000 of IP block discovery. Method 1000 may be implemented by the environment described with reference to FIG. 1. FIG. 10 is also an illustrative example of the processing performed by the discovery system described with reference to FIG. 9.

In block 1005, the processor, or processor system, sends a request to the discover circuit. The request is for a list or inventory of IP blocks implemented within the IC. In block 1008, the discover circuit receives the request from the processor.

In block 1010, the discover circuit processes the request. In the case where the request asks for a listing of IP blocks within the IC and the memory map is unified and centralized, the discover circuit reads the memory map and collects data from the records contained therein. The data collected from the records is collected in accordance with, or subject to, the security settings specified within each respective record.

In the case where the request asks for a listing of IP blocks within the IC and the memory map is distributed among the IP blocks, the discover circuit issues a query to the IP blocks and collects responses. Accordingly, the information collected by the discover circuit includes only that information which is provided from the various IP blocks.

In block 1015, the discover circuit generates a reply. The reply may specify the collected information from the various records of the memory map as previously described. For each IP block on the list, the reply may specify the IP block ID, the address range, and the IP configuration data from the record of the IP block. The reply is generated in accordance with the security setting for each IP block. As noted, in one aspect, the security setting for a record may specify a security setting that is applied to requests from an external system and also to requests from the on-chip processor. In another aspect, the security setting may specify an external system specific security setting and an on-chip processor specific security setting.

In block 1020, the discover circuit sends the reply to the processor. The processor may utilize the list of available IP blocks to perform further functions such as selecting a path of execution, offloading one or more operations to an IP block on the list, attempting to communicate and/or configure one or more of the IP blocks, etc.

In accordance with the inventive arrangements described within this disclosure, an IC is configured to respond to requests to provide information about the various IP blocks implemented therein. The information provided to the requesting entity is subject to security settings that may be implemented within the IC on a per-IP block basis. As such, those IP blocks considered sensitive may be restricted and, as such, excluded from any information provided from the IC responsive to a received request. A user is able to determine specific implementation details for the IC simply from querying the IC itself. The information and listing of IP blocks is obtained for those IP blocks that otherwise are unable to respond to queries.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

As defined herein, the term "automatically" means without user intervention. As defined herein, the term "user" means a human being. The term "and/or" as used herein refers to and encompasses any and all possible combinations of one or more of the associated listed items. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when," "upon," "in response to determining," "in response to detecting," "responsive to determining," or "responsive to detecting," depending on the context. Similarly, the phrase "if it is determined" or the phrase "if [a stated condition or event] is detected" may be construed to mean "upon determining," "in response to determining," "responsive to determining," "upon detecting [the stated condition or event]," "in response to detecting [the stated condition or event]," or "responsive to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a computer-readable data storage medium. As defined herein, the term "computer-readable storage medium" means a storage medium that contains or stores program code for use by or in connection with an instruction execution system, apparatus, or device. As defined herein, a "computer-readable storage medium" is non-transitory and, as such, is not a transitory propagating signal per se. Examples of a computer-readable storage medium may include, but are not limited to, optical media, magnetic media, magneto-optical media, computer memory such as random access memory, a bulk storage device, e.g., hard disk, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect, the blocks in the flow chart illustration may be performed in increasing numeric order corresponding to the numerals in the various blocks. In other aspects, the blocks may be performed in an order that is different, or that varies, from the numerals in the blocks. For example, two or more blocks shown in succession may be executed substantially concurrently. In other cases, two or more blocks may sometimes be executed in the reverse order, depending upon the functionality involved. In still other cases, one or more blocks may be performed in varying order with the results being stored and utilized in subsequent or other blocks that do not immediately follow.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The corresponding structures, materials, acts, and equivalents of all means or step plus function elements in the claims below are intended to include any structure, material, or act for performing the function in combination with other claimed elements as specifically claimed.

An IC includes a bridge circuit configured to receive a first request from an external system, a discover circuit coupled to the bridge circuit and configured to process the first request received from the bridge circuit, and a memory map coupled to the discover circuit. The memory map stores records for a plurality of IP blocks implemented within the IC. The discover circuit is configured to generate a list of the plurality of IP blocks implemented within the IC from the records of the memory map responsive to the first request. The bridge circuit is configured to send the list to the external system.

In one aspect, the memory map stores security settings for the plurality of IP blocks and the discover circuit generates the list subject to the security settings for the IP blocks.

The memory map may specify an address range for the plurality of IP blocks. The discover circuit may specify the address range for the IP blocks in the list.

In another aspect, a second request is received. The second request specifies an address of an IP block. The discover circuit compares the address with the address ranges of the memory map and selectively discards the second request according to the comparison.

The memory map may also store strings specifying IP block configuration data for the plurality of IP blocks implemented within the IC. The discover circuit may include the strings within the list.

In a further aspect, the request is formatted using a first communication protocol. The bridge circuit is configured to translate the request from the first communication protocol to a second and different communication protocol. The bridge circuit translates a reply comprising the list from the second communication protocol to the first communication protocol prior to sending.

Responsive to a first IP block implemented within the IC being replaced with a second and different IP block, a record including first information for the first IP block is the memory map is updated with second information for the second IP block. For example, responsive to receiving a communication including the second information from the second IP block, the discover circuit updates the record of the first IP block with the second information.

The memory map may include a plurality of distributed memory elements implemented as part of the plurality of IP blocks of the IC. The distributed memory elements store the records for the plurality of IP blocks. The discover circuit may generate the list by querying the IP blocks for the records.

An IC includes a processor configured to execute user program code, a discover circuit coupled to the processor and configured to receive a request from the processor, and a memory map coupled to the discover circuit and storing records for a plurality of IP blocks implemented within the IC. The discover circuit is configured to generate a list of the plurality of IP blocks implemented within the IC from the records of the memory map responsive to the request. The discover circuit is configured to send the list to the processor.

The memory map may store security settings for the plurality of IP blocks. The discover circuit may generate the list subject to the security settings for the IP blocks.

The memory map also may specify an address range for the plurality of IP blocks. The discover circuit specifies the address range for the IP blocks in the list.

The memory map further may store strings specifying IP block configuration data for the plurality of IP blocks implemented within the IC. The discover circuit includes the strings within the list.

Responsive to a first IP block implemented within the IC being replaced with a second and different IP block, a record including first information for the first IP block in the memory map is updated with second information for the second IP block. For example, responsive to receiving a communication including the second information from the second IP block, the discover circuit updates the record of the first IP block with the second information.

The memory map may include a plurality of distributed memory elements implemented as part of the plurality of IP blocks of the IC. The distributed memory elements store the records for the plurality of IP blocks. The discover circuit generates the list by querying the IP blocks for the records.

A method includes receiving, within an IC, a request for information from a requesting system and, responsive to the request, reading a memory map within the IC. The memory map stores records for a plurality of IP blocks implemented within the IC. The method includes generating a list of the plurality of IP blocks implemented within the IC from the memory map and sending the list to the requesting system.

The list may be generated to include information subject to security settings specified on a per-IP block basis.

In one aspect, the request is formatted using a first communication protocol and translated into a second and different communication protocol prior to reading the memory map. A reply including the list is formatted using the second communication protocol and translated into the first communication protocol prior to sending to the external system.

In another aspect, responsive to replacing a first IP block of the IC with a second IP block of the IC, the record of the memory map for the first IP block is updated with information for the second IP block.

The features described within this disclosure can be embodied in other forms without departing from the spirit or essential attributes thereof. Accordingly, reference should be made to the following claims, rather than to the foregoing disclosure, as indicating the scope of such features and implementations.

What is claimed is:

1. An integrated circuit, comprising:
   programmable circuitry;
   a bridge circuit configured to receive a first request from an external system;
   a discover circuit coupled to the bridge circuit and configured to process the first request received from the bridge circuit; and
   a memory map coupled to the discover circuit and storing records for a plurality of Intellectual Property blocks implemented within the integrated circuit;
   wherein each Intellectual Property block is a circuit block implemented within the programmable circuitry of the integrated circuit;
   wherein the discover circuit is configured to generate a list of the plurality of Intellectual Property blocks implemented within the integrated circuit from the records of the memory map responsive to the first request; and
   wherein the bridge circuit is configured to send the list to the external system.

2. The integrated circuit of claim 1, wherein:
   the memory map stores security settings for the plurality of Intellectual Property blocks; and
   the discover circuit generates the list by omitting selected ones of the plurality of Intellectual Property blocks from the list based on the security settings of the respective Intellectual Property blocks.

3. The integrated circuit of claim 1, wherein:
   the memory map specifies an address range for the plurality of Intellectual Property blocks; and
   the discover circuit specifies the address range for the Intellectual Property blocks in the list.

4. The integrated circuit of claim 3, wherein:
   a second request is received specifying an address of an intended Intellectual Property block and having a security setting that prevents storage of a record for the intended Intellectual Property block within the memory map; and
   the discover circuit compares the address with the address ranges of the memory map and selectively discards the second request according to the comparison.

5. The integrated circuit of claim 1, wherein:
   the memory map stores strings specifying Intellectual Property block configuration data for the plurality of Intellectual Property blocks implemented within the integrated circuit; and
   the discover circuit includes the strings within the list.

6. The integrated circuit of claim 1, wherein, responsive to a first Intellectual Property block implemented within the integrated circuit being replaced with a second and different Intellectual Property block, a record comprising first information for the first Intellectual Property block in the memory map is updated with second information for the second Intellectual Property block.

7. The integrated circuit of claim 6, wherein responsive to receiving a communication comprising the second information from the second Intellectual Property block, the discover circuit updates the record of the first Intellectual Property block with the second information.

8. The integrated circuit of claim 6, wherein
   the second Intellectual Property block is implemented as part of partial reconfiguration of the integrated circuit.

9. The integrated circuit of claim 1, wherein:
   the memory map comprises a plurality of distributed memory elements implemented as part of the plurality of Intellectual Property blocks of the integrated circuit;
   the distributed memory elements store the records for the plurality of Intellectual Property blocks; and
   wherein the discover circuit generates the list by querying the Intellectual Property blocks for the records.

10. An integrated circuit comprising:
    a processor configured to execute user program code;
    programmable circuitry;
    a discover circuit coupled to the processor and configured to receive a request from the processor; and
    a memory map coupled to the discover circuit and storing records for a plurality of Intellectual Property blocks implemented within the integrated circuit;
    wherein each Intellectual Property block is a circuit block implemented within the programmable circuitry of the integrated circuit;
    wherein the discover circuit is configured to generate a list of the plurality of Intellectual Property blocks implemented within the integrated circuit from the records of the memory map responsive to the request; and
    wherein the discover circuit is configured to send the list to the processor.

11. The integrated circuit of claim 10, wherein:
    the memory map stores security settings for the plurality of Intellectual Property blocks; and
    the discover circuit generates the list by omitting selected ones of the plurality of Intellectual Property blocks from the list based on the security settings of the respective Intellectual Property blocks.

12. The integrated circuit of claim 10, wherein, responsive to a first Intellectual Property block implemented within the integrated circuit being replaced with a second and different Intellectual Property block, a record comprising first information for the first Intellectual Property block in the memory map is updated with second information for the second Intellectual Property block.

13. The integrated circuit of claim 12, wherein responsive to receiving a communication comprising the second information from the second Intellectual Property block, the discover circuit updates the record of the first Intellectual Property block with the second information.

14. The integrated circuit of claim 12, wherein the second Intellectual Property block is implemented as part of partial reconfiguration of the integrated circuit.

15. The integrated circuit of claim 10, wherein:
    the memory map comprises a plurality of distributed memory elements implemented as part of the plurality of Intellectual Property blocks of the integrated circuit;
    the distributed memory elements store the records for the plurality of Intellectual Property blocks; and
    wherein the discover circuit generates the list by querying the Intellectual Property blocks for the records.

16. A method comprising:
    receiving, within an integrated circuit comprising programmable circuitry, a request for information from a requesting system;
    responsive to the request, reading a memory map within the integrated circuit;

wherein the memory map stores records for a plurality of Intellectual Property blocks implemented within the integrated circuit;

wherein each Intellectual Property block is a circuit block implemented within the programmable circuitry of the integrated circuit;

generating a list of the plurality of Intellectual Property blocks implemented within the integrated circuit from the memory map; and sending the list to the requesting system.

17. The method of claim 16, wherein the list is generated by excluding selected ones of the plurality of Intellectual Property blocks from the list based on the security settings of the respective Intellectual Property blocks.

18. The method of claim 16, further comprising:

responsive to replacing a first Intellectual Property block of the IC with a second Intellectual Property block of the IC, updating the record of the memory map for the first Intellectual Property block with information for the second Intellectual Property block.

19. The method of claim 18, wherein the second Intellectual Property block is implemented as part of partial reconfiguration of the integrated circuit.

20. The method of claim 16, wherein:

the memory map comprises a plurality of distributed memory elements implemented as part of the plurality of Intellectual Property blocks of the integrated circuit;

the distributed memory elements store the records for the plurality of Intellectual Property blocks; and the list is generated by querying the Intellectual Property blocks for the records.

* * * * *